(12) United States Patent
Nichols et al.

(10) Patent No.: US 7,568,194 B2
(45) Date of Patent: Jul. 28, 2009

(54) METHOD AND SYSTEM FOR AVAILABILITY CHECKING ON DISTRIBUTED OBJECTS

(75) Inventors: David Nichols, Redmond, WA (US); Yiu-Ming Leung, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 11/067,610

(22) Filed: Feb. 25, 2005

(65) Prior Publication Data
US 2006/0195834 A1 Aug. 31, 2006

(51) Int. Cl.
G06F 9/44 (2006.01)
(52) U.S. Cl. .................. 717/168; 717/166
(58) Field of Classification Search .......... 717/166, 717/168
See application file for complete search history.

(56) References Cited

U.S. PATENT DOCUMENTS

| | | | |
|---|---|---|---|
| 5,925,100 A * | 7/1999 | Drewry et al. ........... 709/219 |
| 6,438,590 B1 | 8/2002 | Gartner et al. |
| 6,442,753 B1 | 8/2002 | Gerard et al. |
| 6,640,255 B1 | 10/2003 | Snyder et al. |
| 7,055,147 B2 | 5/2006 | Iterum et al. |
| 7,155,712 B2 | 12/2006 | Takimoto et al. |
| 7,171,672 B2 | 1/2007 | Just |
| 2003/0159135 A1 * | 8/2003 | Hiller et al. ........... 717/166 |
| 2004/0019596 A1 * | 1/2004 | Taylor et al. ........... 707/100 |
| 2005/0137856 A1 * | 6/2005 | Cencini et al. ........... 704/10 |
| 2005/0278709 A1 * | 12/2005 | Sridhar et al. ........... 717/136 |
| 2006/0195820 A1 | 8/2006 | Curtis et al. |
| 2007/0245338 A1 | 10/2007 | Musha |

* cited by examiner

*Primary Examiner*—Wei Y Zhen
*Assistant Examiner*—Philip Wang
(74) *Attorney, Agent, or Firm*—Perkins Coie LLP

(57) ABSTRACT

A subsystem provides for availability checking on all necessary/desired objects prior to creating and coupling the objects. In one embodiment, the subsystem is knowledgeable of the objects it supports and each of the objects' related objects. The subsystem uses this information to determine the objects that are supported by both itself and a remote subsystem. The subsystem then uses this information to determine, prior to creating an instance of an object, whether the object and all of its related objects are supported by both the subsystem and the remote subsystem.

16 Claims, 9 Drawing Sheets

DO Relationship Table

| Specified DO | Related DOs |
|---|---|
| A | B, C, E |
| B | C, D, F |
|  | ⋮ |
| Z | H, I |

Interface File for DO A    302

```
if  version 1    B version 2    B, C version 3    C
```

*FIG. 3*

DO Relationship Table

| Specified DO | Version | Related DOs |
|---|---|---|
| A | 1 | B |
| A | 2 | B, C |
| A | 3 | C |
| B | 1 | D |
| ⋮ | ⋮ | ⋮ |

METHOD AND SYSTEM FOR AVAILABILITY CHECKING ON DISTRIBUTED OBJECTS

CROSS-REFERENCE TO RELATED APPLICATIONS

This application is related to the co-pending and commonly owned U.S. Patent Application entitled "Method and System for Version Negotiation of Distributed Objects," filed on even date herewith, U.S. patent application Ser. No. 11/066,717, which is incorporated by reference herein in its entirety.

TECHNICAL FIELD

The described technology is directed generally to distributed computer applications and, more particularly, to performing an early availability check to ensure that the necessary distributed objects are available.

BACKGROUND

The proliferation of computers and the advent of the Internet and the maturing of the World Wide Web ("web") have significantly increased the use of distributed application programs. Examples of distributed application programs include collaboration programs, chat room programs, instant messaging programs, conferencing programs, gaming programs, and the like. Each of these application programs enable multiple, geographically distributed computer users to interactively exchange information in real time.

One prevalent method of creating the distributed application programs is to use object-oriented programming. Object-oriented programming is a method of creating computer programs by combining or linking reusable components, called "objects," to create applications. An object is a programming unit containing both data and instructions for performing operations on that data. In object-oriented programming, the operations are referred to as "methods."

Object-oriented application programs use objects to define their data and the methods that operate on the data. Typically, two objects communicate with each other via messages, which include a protocol that defines the method of communication. In distributed application programs, these objects can reside, for example, on different computing systems and across networks, within different application processes running on the same computing system, within different components/subcomponents running within the same process, different processes, or a different process on a different computing system. Distributed computing is frequently based on the client-server paradigm, and in client-server terminology, the requesting object is referred to as the client object and the servicing object is referred to as the server object.

In a distributed configuration where different subsystems—e.g., an instance of a distributed application program on a client computing system and an instance of the distributed application program on a server computing system—use remote objects or distributed objects (DOs) as the mechanism for communication, the DOs are connected or coupled in pairs. For example, a DO in one subsystem—i.e., a client subsystem—is coupled to a corresponding DO in the other subsystem—i.e., a server subsystem—through a separate logical channel. Where we have multiple DOs, each of the DOs in the client needs to be coupled to its corresponding DO in the server.

A drawback to the current distributed configuration where different subsystems use DOs as the method for communication is that it is not possible to ensure that all of the required objects are available when the connection is established between the communicating subsystems. The subsystem does not have prior knowledge or information of all the DOs that are required. The subsystem attains knowledge of a required DO only when the DO needs to be created. Therefore, the distributed subsystems proceed to function as if everything was fine even if one or more DOs are missing or not supported by either or both subsystems. Then, when one or both subsystems realize that a required DO is missing, the communication between the subsystems is adversely affected, and the subsystems are no longer able to communicate.

It would be desirable to have a technique that would allow the different subsystems in a distributed configuration to perform an early availability check on all necessary/desired DOs when the subsystems connect, or soon thereafter.

BRIEF DESCRIPTION OF THE DRAWINGS

FIG. 2 is a diagram illustrating an example DO relationship table, according to one embodiment.

FIG. 3 is a diagram illustrating an example interface file, according to another embodiment.

FIG. 4 is a diagram illustrating an example DO relationship table, according to another embodiment.

DETAILED DESCRIPTION

Figure 1:
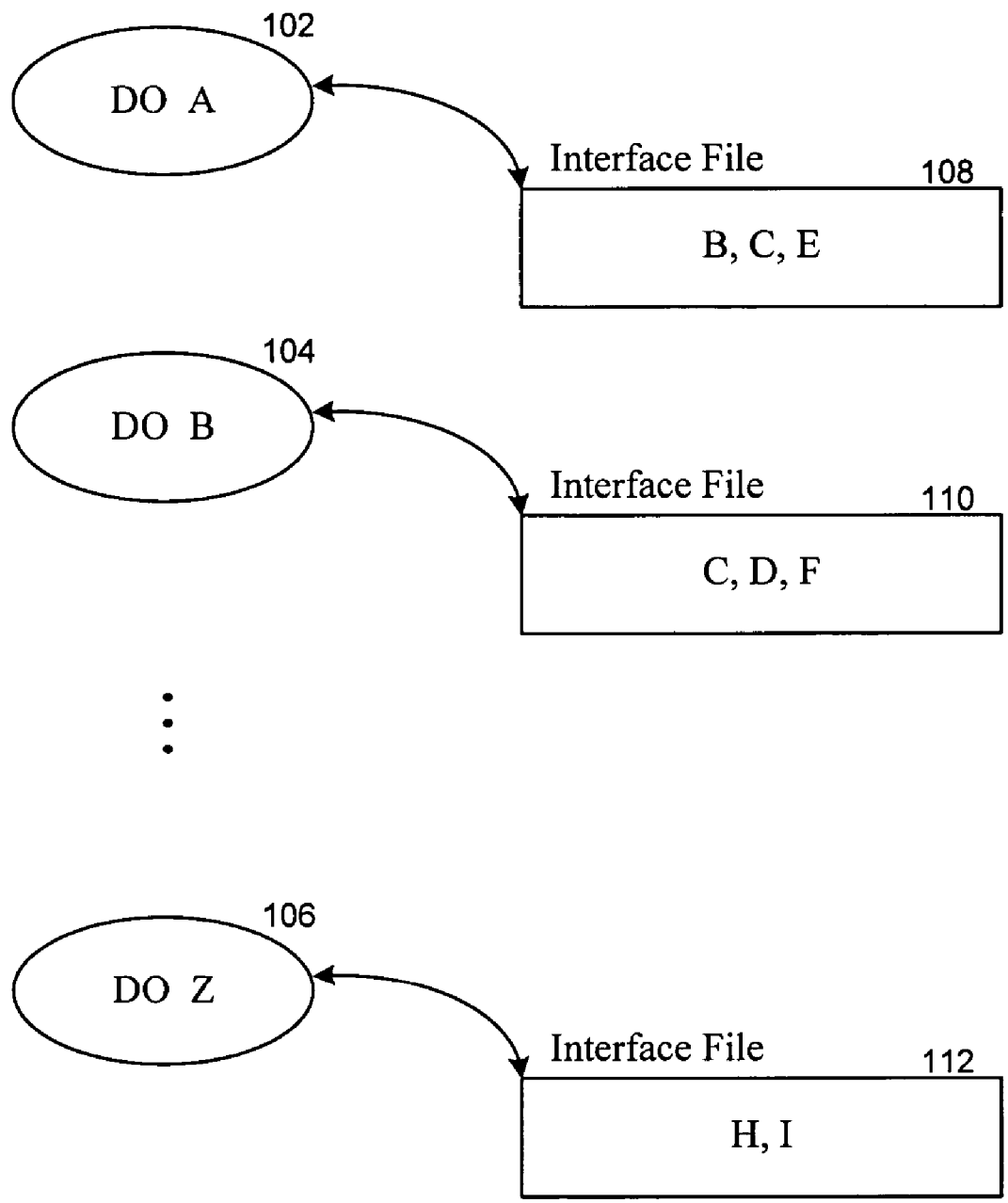
FIG. 1 is a diagram illustrating example DOs and their interface files in a subsystem, according to one embodiment.

A method and system that allows distributed subsystems to conduct an early availability check on all necessary/desired DOs is provided. In one embodiment, a DO interface file, or other suitable collection of data, allows a server subsystem, which is establishing the logical channel or coupling between the DOs on the server subsystem with their respective, corresponding DOs in a client subsystem, to perform an early full type check to make sure that all the necessary/desired DOs are available when the client subsystem and server subsystem connect, or shortly thereafter, and before starting the DO creation/coupling sequence.

In one embodiment, a DO interface file is created for each DO in the server subsystem, and each DO interface file specifies the relationship between its associated DO and the other necessary/desired DOs. The relationship indicates the other DOs that need to be created whenever the associated DO gets created in the server subsystem. For example, a DO interface file for a "DO A" may indicate that "DO A" is related to "DO B" and "DO C," which means that "DO B" and "DO C" are the other necessary/desired objects that need to be created whenever "DO A" is created.

By way of example, an application developer who is knowledgeable of the subsystem program or logic—i.e., the developer of the subsystem—may declaratively specify the relationships or links between the DOs in the DO interface files. The DO interface files may then be compiled with the subsystem program to create an executable of the subsystem which has internal knowledge of the DO relationships. For example, the executable may generate an internal DO relationship table that specifies the DO relationships.

Once an instance of the subsystem executes and receives an indication of a DO as a "root" DO from a client subsystem, the server subsystem can check the internal DO relationship table to determine if the root DO and the necessary/desired DOs that are related to the root DO are available in both the server subsystem and the client subsystem. The root DO is a designation for the first DO to be coupled, and from which the object tree is built. If the server subsystem determines from the internal DO relationship table that the root DO and the necessary/desired DOs are not available, the server subsystem terminates the connection between itself and the client subsystem. Conversely, if the server subsystem determines from the internal DO relationship table that the root DO and the necessary/desired DOs are available, the server subsystem proceeds to create the root DO in the server subsystem if the root DO has not been already created, for example, when the server subsystem was initialized, and couple it with its corresponding—i.e., counterpart—DO in the client subsystem. The server subsystem may then proceed to subsequently create, if necessary, and couple each of the related DOs to its corresponding DO in the client subsystem according to, for example, the relationships specified in the internal DO relationship table.

In one embodiment, the DO interface file may specify the relationship between different versions of its associated DO and the other necessary/desired DOs. For example, an application developer may specify in a DO interface file for a "DO A" that version 1 of "DO A" is related to "DO B" and "DO C," and version 2 of "DO A" is related to "DO C" and "DO D." This may then be interpreted to mean that "DO B" and "DO C" are the other necessary/desired objects that need to be created whenever version 1 of "DO A" is created, and that "DO C" and "DO D" are the other necessary/desired objects that need to be created whenever version 2 of "DO A" is created.

In one embodiment, the server subsystem may utilize a negotiated DO table to determine whether or not the necessary/desired DOs are available. The negotiated DO table contains a list of the DOs that are available to be created in both the client subsystem and the server subsystem. For example, after the client subsystem starts up and connects to the server subsystem, the client subsystem can send to the server subsystem a list of all of the DOs that the client subsystem can support. The list of the supported DOs may be referred to as a "protocol superset." The protocol superset is comprised of all of the interfaces—i.e., protocols—that are supported, for example, by the client subsystem. When the server subsystem receives the protocol superset from the client subsystem, the server subsystem is able to determine a list of DOs—i.e., a list of interfaces or protocols—that are supported in both the client and the server subsystems, and maintains this list in the negotiated DO table. The server subsystem may then send the negotiated DO table to the client subsystem. It will be appreciated that if there are DOs that are found to be incompatible or otherwise not present/supported in either the server subsystem and/or the client subsystem, the server subsystem does not consider this an error condition. Rather, these incompatible or "bad" DOs will be absent from the negotiated DO table.

In one embodiment, the client subsystem sends to the server subsystem a list of all of the DOs and their versions that the client subsystem can support in the protocol superset. When the server subsystem receives the protocol superset from the client subsystem, the server subsystem is able to determine a list of DOs and their negotiated version by, for example, matching the versions for each DO in the protocol superset and determining a compatible version of the DO that is common or supported in both the client subsystem and the server subsystem. In one embodiment, a negotiation technique for determining the compatible version may be to select the highest or latest version that is common to both the server and the client subsystems. In other embodiments, a different negotiation technique can be used to determine the compatible version of the DO.

In another embodiment, both a server subsystem a client subsystem can each create and utilize a negotiated DO table which contains a list of the DOs that are available to be created in both the client and the server subsystems. For example, after the initial connection is made between the client subsystem and the server subsystem, the client subsystem can send to the server subsystem its protocol superset, and the server subsystem can send to the client subsystem its protocol superset. Then the client subsystem and the server subsystem can each determine a list of DOs that are supported in both the client and the server subsystems, and maintains this list in their respective negotiated DO table. If versioning is supported, the client subsystem and the server subsystem can each determine a compatible version of the DO that is common or supported in both the client and the server subsystems by applying the same negotiation technique.

Even though the DO interface file is described in conjunction with the operation of the server subsystem, one skilled in the art will appreciate that the benefits and technical advantages provided by the DO interface file need not be limited to the server subsystem. For example, an application developer may create a DO interface file for each DO in the client subsystem, in which case the client subsystem may receive an indication of a root DO from a server subsystem and check its internal DO relationship table to determine if the necessary/desired DOs are available in both the client and the server subsystems. Likewise, the client subsystem may create and use the negotiated DO table to determine whether or not the necessary/desired DOs are available.

One skilled in the art will also appreciate that a unique interface file need not be created for each DO. Here, a single interface file can specify the relationships of multiple DOs and their respective necessary/desired DOs. For example, an application developer can specify in a single interface file that a first DO, for example, "DO A," is related to "DO B" and "DO C," and in the same interface file, also specify that a second DO, for example, "DO B," is related to "DO E," "DO F," and "DO G," and so on.

One skilled in the art will further appreciate that the DO relationships need not be specified in the interface files or other collection of data external to the distributed subsystem program, but may be specified within the subsystem programs themselves. Moreover, the DO relationships need not be specified by the application developer, but may be determined by, for example, a process that is capable of determining the DO relationships by parsing the distributed subsystem program code.

In the discussion that follows, various embodiments of the distributed subsystem and its components are further described in conjunction with a variety of illustrative examples. It will be appreciated that the embodiments of the distributed subsystem and its components may be used in circumstances that diverge significantly from these examples in various respects.

For example, even though the DOs are illustrated and described as being coupled to each other, the DOs may be coupled through respective proxy objects. In general terms, a proxy is an object that models the interface of another object. For example, a proxy object located in a client subsystem for a DO located in a server subsystem allows a DO located in the client subsystem to simply communicate with the proxy object—i.e., the proxy of the DO located in the server subsystem—as if the DO located in the server subsystem resides in the client subsystem. The proxy object for the DO located in the server subsystem has all the necessary information and code to encode and decode an operation and its parameters into a message format—i.e., protocol—that can be sent to the real DO located in the server subsystem. This type of proxy is generally referred to as a "remote proxy" because it exists in a subsystem that is remote from the subsystem that actually contains the real DO the proxy models. Likewise, a proxy object located in the server subsystem for a DO located in the client subsystem allows a DO located in the server subsystem to simply communicate with the proxy object as if the DO located in the client subsystem resides in the server subsystem. Also, the proxy object for the DO located in the client subsystem has all the necessary information and code to encode and decode an operation and its parameters into a message format—i.e., protocol—that can be sent to the real DO located in the client subsystem.

Availability Checking on Distributed Objects

FIG. 1 is a diagram illustrating example DOs and their interface files in a subsystem, according to one embodiment. By way of example, three DOs, a "DO A" 102, a "DO B" 104, and a "DO Z" 106 are illustrated in the subsystem depicted in FIG. 1. "DO A" is depicted as having a corresponding interface file 108, "DO B" as having a corresponding interface file 110, and "DO Z" as having a corresponding interface file 112. Each interface file specifies a list of DOs that need to be created whenever the corresponding DO is created in the subsystem. For example, the interface file corresponding to "DO A" specifies that "DO B," "DO C," and "DO E" need to be created whenever "DO A" is created. The interface file corresponding to "DO B" specifies that "DO C," "DO D," and "DO F" need to be created whenever "DO B" is created. The interface file corresponding to "DO Z" specifies that "DO H" and "DO I" need to be created whenever "DO Z" is created. When an object is elected, for example, as a root object, the subsystem can use the information in the elected object's corresponding interface file to determine, without creating the object, whether it can successfully create all the necessary objects before starting the object creation/coupling process.

In one embodiment, the list of DOs in the interface file may be specified in sequence. Referring again to the interface file corresponding to "DO A," the interface file in this embodiment implies a sequence order of creation/coupling of "DO A," then "DO B," then "DO C," and then "DO E." In the subsystem, if "DO A" is elected, "DO A" is first created and coupled to its corresponding object in the remote subsystem, then "DO B" is created and coupled, then "DO C" is created and coupled, and then "DO E" is created and coupled.

In one embodiment, the list of DOs related to an object may be specified as declarative links in the interface definition that defines the objects. An example of the interface definitions for the creation/coupling sequence for "DO A" above—i.e., the object creation sequence "DO A," "DO B," "DO C," "DO E"—may be:

```
Interface ObjectA {
    /** @rpcConnect @rpcType ObjectB */
    String name "name-for-object-B"
    /** @rpcConnect @rpcType ObjectC */
    String name "name-for-object-C"
    /** @rpcConnect @rpcType ObjectE */
    String name "name-for-object-E"
    Some methods...
}
```

For example, in the declarative type link for "Interface ObjectA" above, the annotation @rpcConnect indicates that the string in the line below can be used as the name to be sent to the other end to locate its counterpart. The annotation @rpcType indicates that the next object to be connected using this name is ObjectB. Likewise, the next annotations @rpcConnect and @rpcType indicate that a subsequent object to be connected using this name is ObjectC, and so one. With this information, once the root object is elected, the two subsystems can determine without creating the object whether they can successfully create all necessary objects before starting the object creation/coupling sequence.

FIG. 2 is a diagram illustrating an example DO relationship table, according to one embodiment. In one embodiment, DO relationship table 202 is generated when the subsystem program is compiled with the DO interface files. The relationship table contains the DO relationships as specified by the DOs and their respective interface files depicted in FIG. 1. In particular, the relationship table identifies the DO, and for each DO, identifies the list of related DOs. The DO relationship table provides the executing subsystem internal knowledge of the DO relationships.

FIG. 3 is a diagram illustrating an example interface file, according to another embodiment. Interface file 302 may be an interface file corresponding to "DO A," and the interface file specifies the list of DOs that need to be created whenever a particular version of "DO A" is created in the subsystem. For example, the depicted interface file specifies that "DO B" needs to be created whenever version 1 of "DO A" is created, "DO B" and "DO C" needs to be created whenever version 2 of "DO A" is created, and "DO C" needs to be created whenever version 3 of "DO A" is created.

An example of the interface definitions for the creation/coupling sequence for "DO A" above may be:

```
Interface ObjectA {
    /** @rpcConnect 1-2 @rpcType ObjectB */
    String name "name-for-object-B"
    /** @rpcConnect 2-3 @rpcType ObjectC */
    String name "name-for-object-C"
    Some methods...
}
```

For example, in the declarative type link for "Interface ObjectA" above, the annotation @rpcConnect indicates that the string in the line below can be used as the name to be sent to the other end to locate its counterpart. The value "1-2" indicates a version range—i.e., that the name can only be used when ObjectA is of version from 1 to 2. The annotation @rpcType indicates that the next object to be connected using this name is ObjectB. Likewise, the value "2-3" indicates that the name can only be used when ObjectA is of version from 2 to 3. The annotation @rpcType indicates that the next object to be connected using this name is ObjectC. The information in the declarative type links indicate that when ObjectA is version 1, ObjectB is the next object to be connected; when ObjectA is version 2, ObjectB and ObjectC are the next objects to be connected; and when ObjectA is version 3, ObjectC is the next object to be connected. With this information, once the root object is elected, the two subsystems can determine without creating the object whether they can successfully create all necessary objects before starting the object creation/coupling sequence.

FIG. 4 is a diagram illustrating an example DO relationship table, according to another embodiment. Similar to the relation table in FIG. 2 above, DO relationship table 402 may be generated when the subsystem program is compiled with the DO interface files. The relationship table represents the DO relationships as specified by the various versions of "DO A" depicted in FIG. 3. In particular, the relationship table identifies the DO, a corresponding version or range of versions of the DO, and for each version of DO, identifies the list of related DOs.

Figure 5:
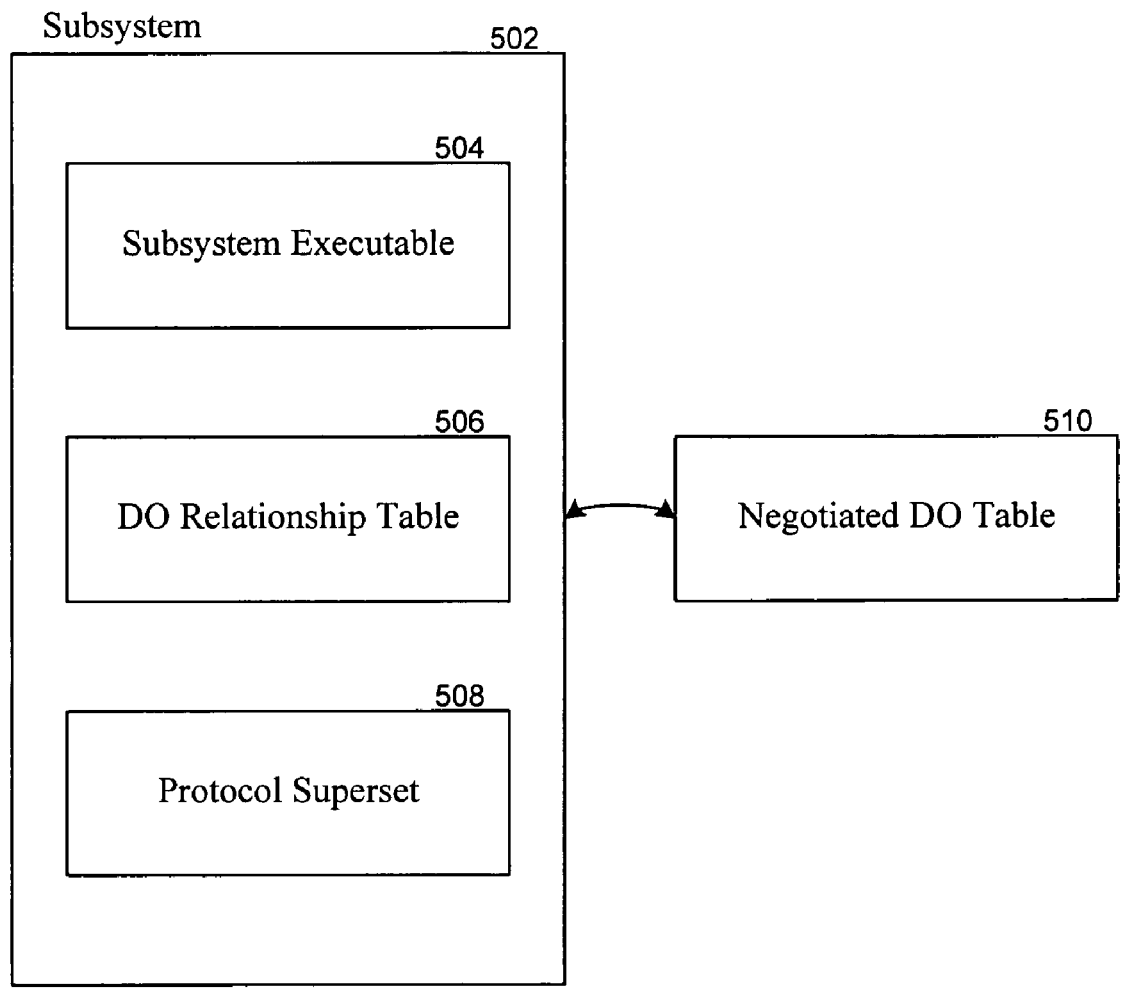
FIG. 5 is a block diagram that illustrates selected data stores and components of an executing subsystem, according to one embodiment.

FIG. 5 is a block diagram that illustrates selected data stores and components of an executing subsystem, according to one embodiment. Subsystem 502 comprises a subsystem executable 504, a DO relationship table 506, and a protocol superset 508. The subsystem executable is the executable code that is executed on a computing system. The DO relationship table contains the DO relationships for each DO in the subsystem. The protocol superset contains a list of DOs supported by the subsystem and is used by the subsystem executable to determine whether a particular DO is supported—i.e., available. For example, when a remote subsystem establishes a connection—i.e., communication channel—with the subsystem, the subsystem executable receives from the remote subsystem a list of DOs supported by the remote subsystem. The subsystem executable uses the received list of DOs supported by the remote subsystem and the list of DOs in the protocol superset to negotiate a list of DOs that are supported by both itself and the remote subsystem. The negotiated list of DOs may be maintained in a negotiated DO table 510, which may be cached on the computing system. The subsystem executable can refer to the negotiated DO table to determine whether a specified DO and its related DOs are available on both the subsystem and remote subsystem.

The computer systems on which the subsystem and the DOs can execute may include a central processing unit, memory, input devices (e.g., keyboard and pointing devices), output devices (e.g., display devices), and storage devices (e.g., disk drives). The memory and storage devices are computer-readable storage media that may contain instructions that implement the subsystem, the interface files, and other components. In addition, the data structures and message structures may be transmitted via a data transmission medium or a communications link. Various communication links may be used, such as the Internet, a local area network, a wide area network, a point-to-point dial-up connection, a cell phone network, and so on.

Embodiments of the subsystem may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The subsystem may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 6:
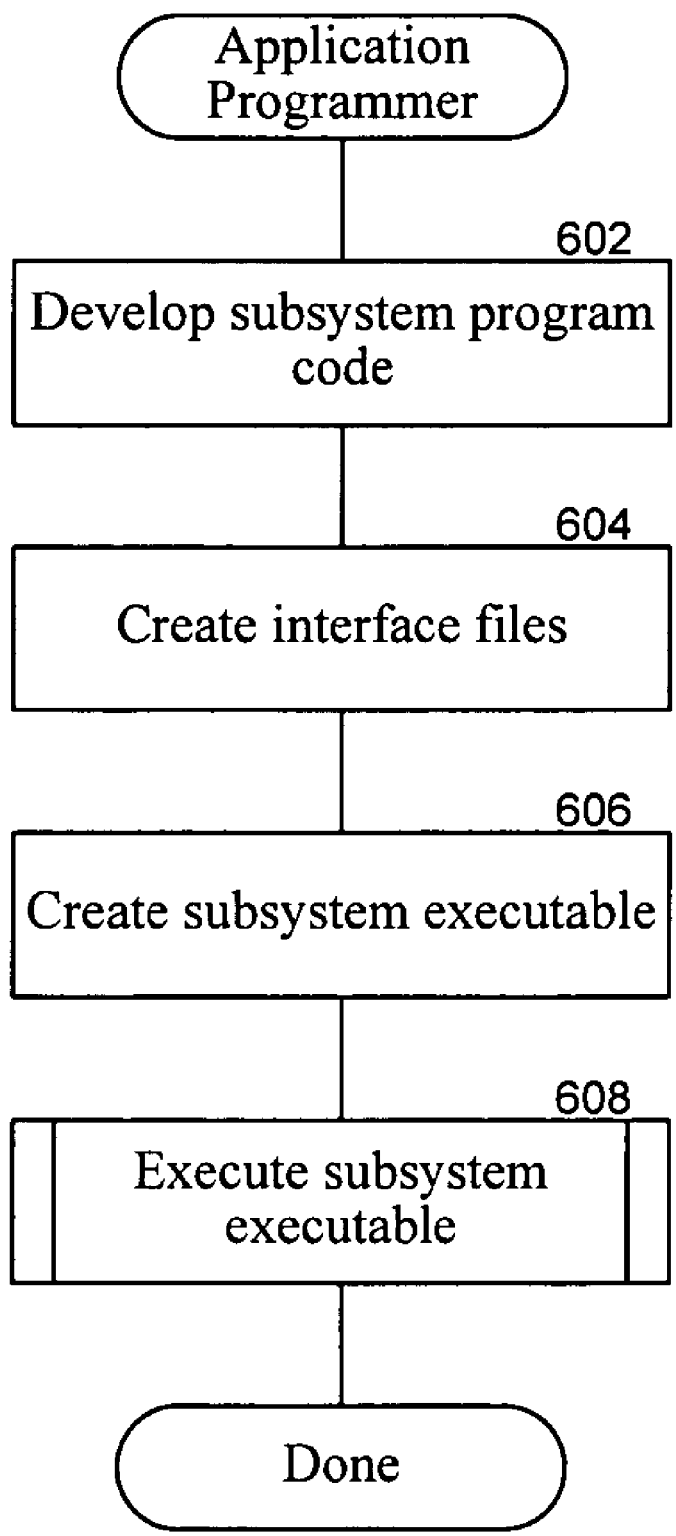
FIG. 6 is a flow diagram illustrating an example process by which an application programmer creates a subsystem executable having internal knowledge of the DO relationships, according to one embodiment.

FIG. 6 is a flow diagram illustrating an example process by which an application programmer creates a subsystem executable having internal knowledge of the DO relationships, according to one embodiment. In block 602, the application programmer develops or writes the subsystem program code. In block 604, the application programmer creates the interface files which specify the DO relationships. In block 606, the application programmer compiles the subsystem program code and the interface files to create a subsystem executable which can be executed on, for example, a computing device. In step 608, the application programmer can execute an instance of the subsystem executable on the computing device.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 7:
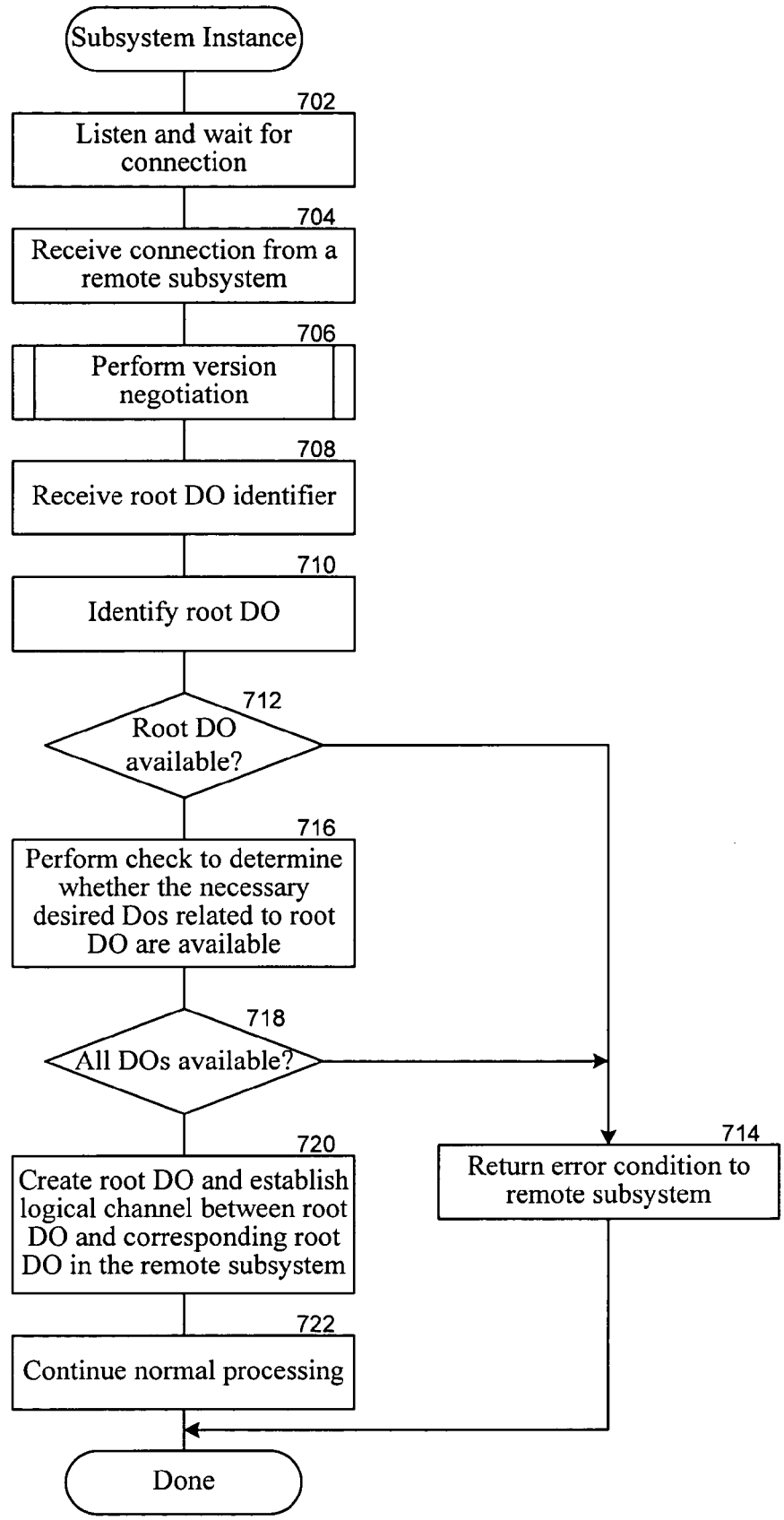
FIG. 7 is a flow diagram illustrating an example process by which an instance of the subsystem executable determines whether the necessary/desired DOs are available, according to one embodiment.

FIG. 7 is a flow diagram illustrating an example process by which an instance of the subsystem executable determines whether the necessary/desired DOs are available, according to one embodiment. In block 702, the instance of the subsystem executable listens and waits for a connection, for example, on a designated port. In block 704, the subsystem receives a connection from a remote subsystem. For example, the subsystem may receive any one of a variety of well-known connection requests from the remote subsystem and, in response, create a connection between itself and the remote subsystem.

In block 706, the subsystem performs version negotiation to determine the DOs that are available on both itself and the remote subsystem. For example, the remote subsystem may have specified the DOs that it can support, and using this information, the subsystem can determine the DOs that are supported by itself and the remote subsystem. For example, the subsystem can compare the DOs that the remote subsystem can support with the contents of its own protocol superset to determine the DOs that are supported by itself and the remote subsystem. The subsystem can maintain this information in the negotiated DO table in cache memory. In block 708, the subsystem receives an identifier for a root DO, for example, through an "rpcConnect" message. The remote subsystem may designate one of its objects to be the root DO and send the name and type of the designated object to the subsystem. In block 710, the subsystem uses the received identifier and identifies the root DO.

In block 712, the subsystem determines whether the identified root DO is available in, or supported by the subsystem. For example, the subsystem may check to determine if the identified root DO is present or identified in the negotiated DO table. If the identified root DO is not available, then, in block 714, the subsystem may return an error condition to the remote subsystem, and end processing. Otherwise, if the identified root DO is determined to be available, then, in block 716, the subsystem checks to determine whether the necessary/desired DOs that are related or associated to the root DO are available. For example, the subsystem can determine the list of DOs related to the root DO from the relationship table, and check the negotiated DO table to determine if the related DOs are present or identified in the negotiated DO table. In block 718, if the subsystem determines that all of the related DOs are not available, then, in block 714, the subsystem may return an error condition to the remote subsystem, and end processing.

Otherwise, if all of the related DOs are determined to be available, then, in block 720, the subsystem creates an instance of the root DO and establishes a logical channel between the instance of the root DO and the corresponding object in the remote subsystem. In block 722, the subsystem continues normal processing. For example, the subsystem may then create instances of each of the related DOs and, for each related DO, establish a logical channel between the instance of the related DO and its corresponding DO in the remote subsystem.

One skilled in the art will appreciate that many variations of the described techniques are possible. For example, the subsystem can listen for an incoming connection on a network or other suitable address other than a port.

Version Negotiation

A distributed application program's version can be generated from the methods and parameters defined in the DOs that are supported by the application program. Each DO exposes an interface that defines the methods and parameters contained in the DO. Two coupled DOs, for example, one DO in a client subsystem and another DO in a server subsystem, can be of the same type or of different types. DOs of the same type expose the same interface, while DOs of different types expose different interfaces. DOs with different interfaces may have different methods or different usage on the methods.

Two coupled DOs communicate with each other through a protocol, such as RPC (Remote Procedure Call). In order for the coupled DOs to communicate properly, the DOs need to have the same "signature." In one embodiment, a signature—e.g., a protocol hash—may be generated for each interface from the methods and parameters defined by the interface. Because a signature is generated or derived from all the methods and parameters defined by an interface, a different signature represents a separate and different version of the interface. For example, when a DO is mutated—e.g., a new method is added to the interface, an existing method is removed or changed, etc.—this generates a different interface and correspondingly, a different signature, and therefore a new version of the interface. A DO contains implementation for the versions of each interface that the DO supports. Thus, in order for two DOs to communicate, the DOs need to negotiate a common version for the interfaces supported by both DOs.

Figure 8:
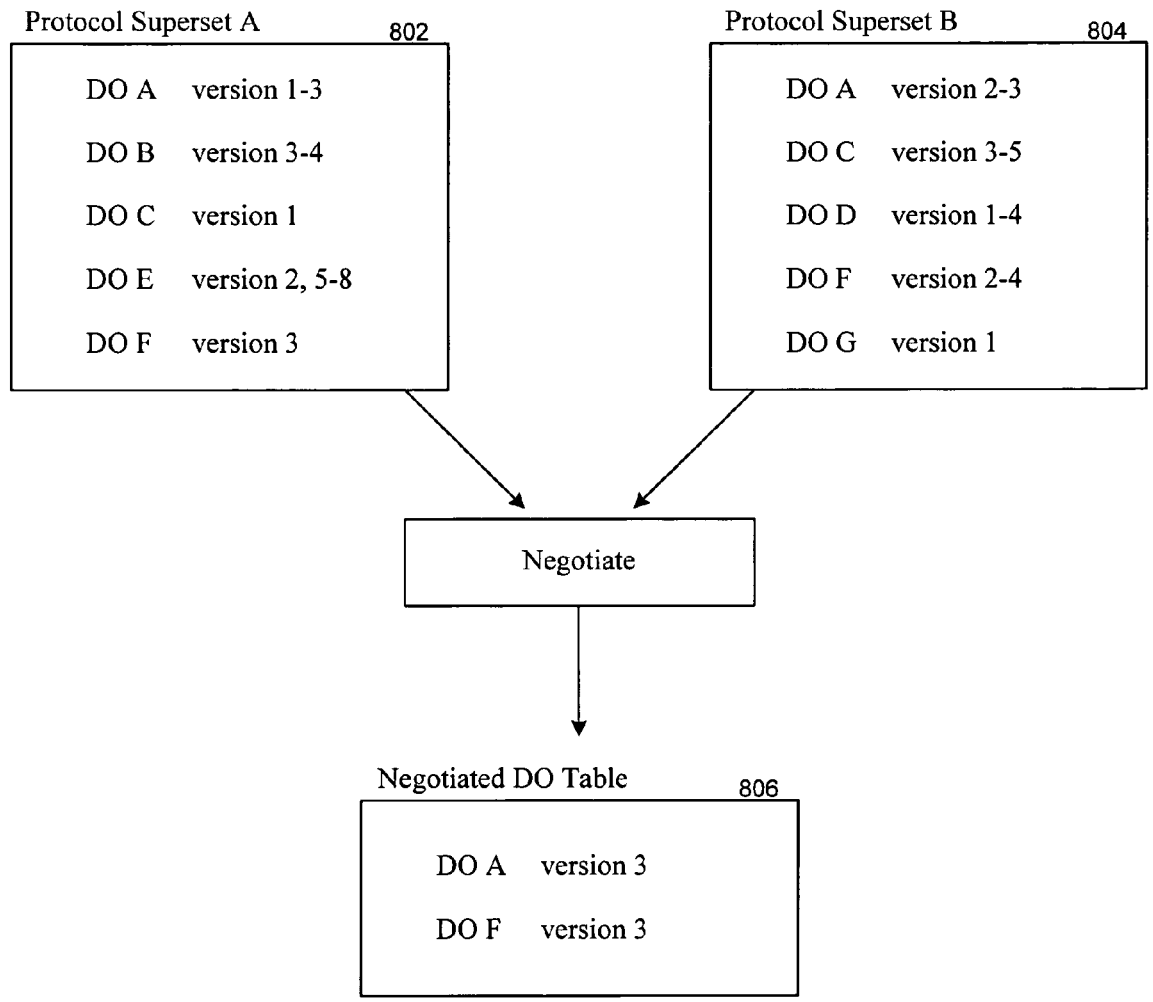
FIG. 8 is a block diagram that illustrates an example negotiation of two protocol supersets to create a negotiated DO table, according to one embodiment.

FIG. 8 is a block diagram that illustrates an example negotiation of two protocol supersets to create a negotiated DO table, according to one embodiment. A Protocol Superset A 802 and a Protocol Superset B 804 are negotiated to generate a negotiated DO table 806. For example, Protocol Superset A may specify all the versions of the objects that are supported in a client subsystem and Protocol Superset B may specify all the versions of the objects that are supported in a server subsystem. Moreover, the client subsystem may provide Protocol Superset A to the server subsystem, thus enabling the server subsystem or other suitable process to perform the negotiation to determine the objects that are supported by both the client subsystem and the server subsystem.

As depicted, Protocol Superset A identifies "DO A version 1-3," "DO B version 3-4," "DO C version 1," "DO E version 2, 5-8," and "DO F version 3" as the versions of each interface of the DOs that are supported in the client subsystem. Protocol Superset B identifies "DO A version 2-3," "DO C version 3-5," "DO D version 1-4," "DO F version 2-4," and "DO G version 1" as the versions of each interface of the DOs that are supported in the server subsystem. The server subsystem then computes the negotiated DO table by, for example, matching the DOs in Protocol Superset A with the DOs in Protocol Superset B. Then, for each matching DO, the server subsystem determines if there is a common version of the DO in both protocol supersets. If a single version of a matching object is found in both protocol supersets, the server subsystem includes the version of the object—i.e., an indication of the object and the version—in the negotiated DO table. If multiple versions of a matching object are found in both protocol supersets, the server subsystem utilizes a selection technique to select one of the multiple versions, and includes an indication of the selected version of the object in the negotiated DO table. In one embodiment, the selection technique is to select the highest of the multiple versions. As depicted in FIG. 8, applying the selection technique of selecting the highest version, the negotiated DO table identifies "DO A version 3" and "DO F version 3" as the versions of the objects that are supported in both the client and the server subsystems.

In one embodiment, the protocol superset may be a table comprised of protocol hashes together with their corresponding versions of the interfaces supported by a subsystem, keying on their type name. The client subsystem sends its table to the server subsystem during version negotiation. The server subsystem is then able to compute the negotiated DO table from the client subsystem's table and its own table. The calculated negotiated DO table contains the versions of all the interfaces—i.e., DOs—that can be used, also keyed on the type name. As such, the negotiated DO table is a subset of the protocol superset. If an interface contained in either of the protocol supersets is missing in the negotiated DO table, this means that there is no common version for that interface in both the client subsystem and the server subsystem.

Figure 9:
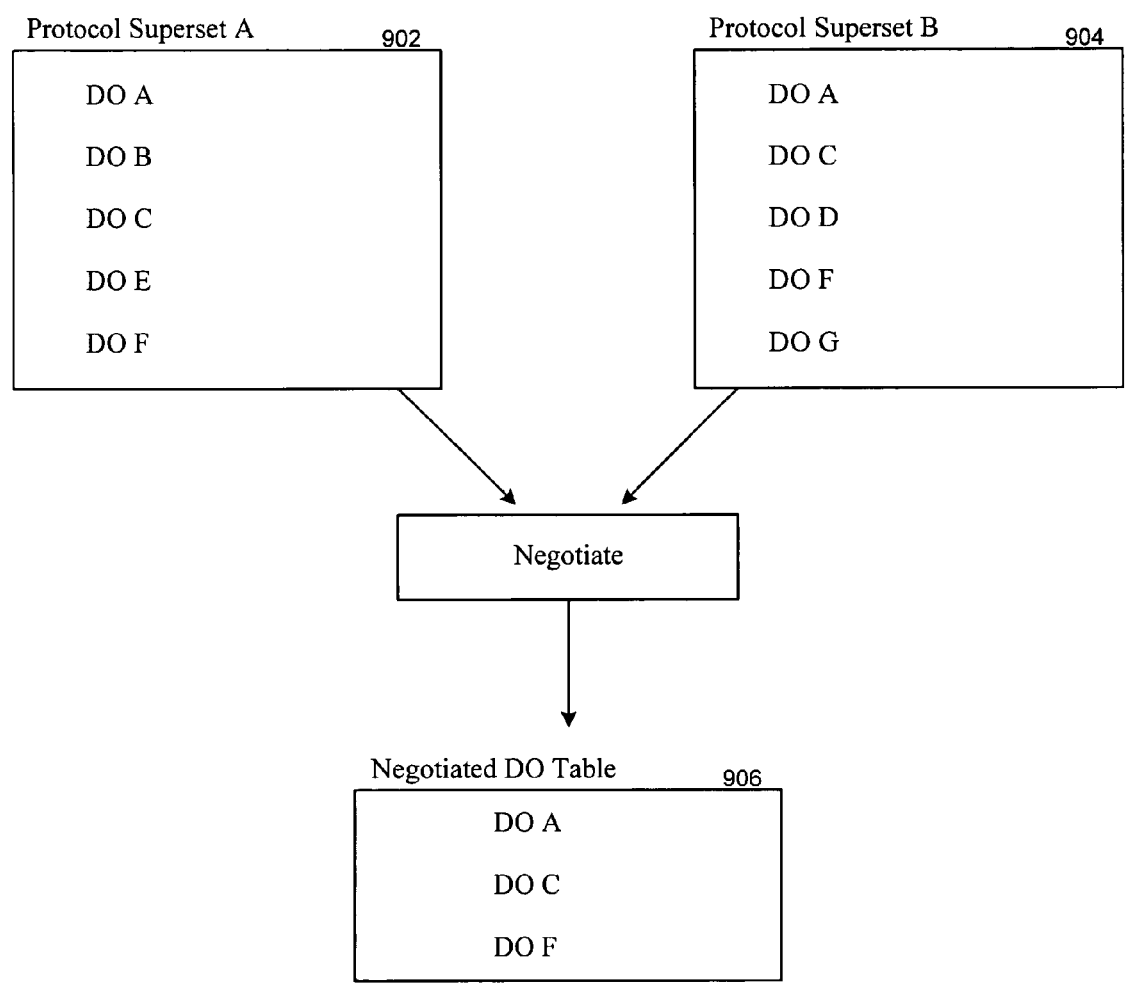
FIG. 9 is a block diagram that illustrates an example negotiation of two protocol supersets to create a negotiated DO table, according to another embodiment.

FIG. 9 is a block diagram that illustrates an example negotiation of two protocol supersets to create a negotiated DO table, according to another embodiment. A Protocol Superset A 902 and a Protocol Superset B 904 are negotiated to generate a negotiated DO table 906. For example, Protocol Superset A may specify all the objects that are supported in a client subsystem and Protocol Superset B may specify all the objects that are supported in a server subsystem. Moreover, the client subsystem may provide Protocol Superset A to the server subsystem, thus enabling the server subsystem to perform the negotiation to determine the objects that are supported by both the client subsystem and the server subsystem.

As depicted, Protocol Superset A identifies "DO A," "DO B," "DO C," "DO E," and "DO F" as the DOs that are supported in the client subsystem. Protocol Superset B identifies "DO A," "DO C," "DO D," "DO F," and "DO G" as the DOs that are supported in the server subsystem. The server subsystem then computes the negotiated DO table by, for example, matching the DOs in Protocol Superset A with the DOs in Protocol Superset B. If a matching object is found in both protocol supersets, the server subsystem includes an indication of the object in the negotiated DO table. As depicted, the negotiated DO table identifies "DO A," "DO C," and "DO F" as the objects supported in both the client and the server subsystems.

In one embodiment, the protocol superset may be a table comprised of protocol hashes of all the DOs supported by a subsystem, keying on their type name. The client subsystem sends its table to the server subsystem during version negotiation. The server subsystem is then able to compute the negotiated DO table from the client subsystem's table and its own table. The calculated negotiated DO table contains all the DOs that can be used, also keyed on the type name. As such, the negotiated DO table is a subset of the protocol superset. If a DO contained in either of the protocol supersets is missing in the negotiated DO table, this means that the missing DO is not common to both the client subsystem and the server subsystem.

One skilled in the art will appreciate that in order for the example negotiation technique described above to work properly, objects identified by the same name in both the client subsystem and the server subsystem need to be the same object. For example, "DO A" in the client subsystem needs to be the same as "DO A" in the server subsystem. Moreover, if an object is mutated, the mutated object cannot retain the same name, but is given a different name to ensure that objects having the same name are in fact the same objects. This allows the versioning to be implied in the name of the object. For example, assuming that an objected named "DO A" is mutated and given a new name "DO M," "DO A" may be considered version 1 of the object, and "DO M" may be considered version 2 of the object.

Figure 10:
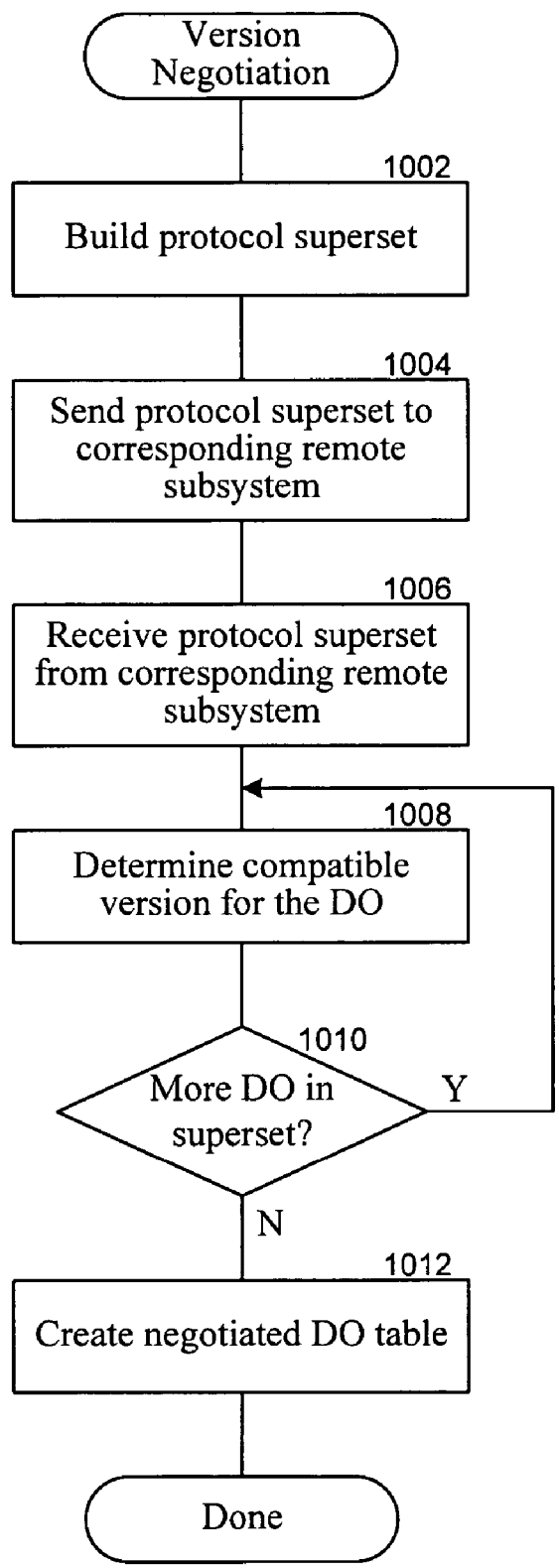
FIG. 10 is a flow diagram illustrating an example process by which two corresponding subsystems perform version negotiation, according to one embodiment.

FIG. 10 is a flow diagram illustrating an example process by which two corresponding subsystems perform version negotiation, according to one embodiment. In this embodiment, a client subsystem and a server subsystem exchange protocol supersets with each other and each performs its own version negotiation. Because the client subsystem and the server subsystem each performs the version negotiation, it is assumed that the client and the server subsystems will each apply the same negotiation or selection technique in order to negotiate or derive the same set of DOs and their versions. In one embodiment, the negotiation or selection technique may be coded into the client and server subsystems by, for example, the application programmer. In other embodiments, the client and server subsystems may negotiate the selection technique. For example, one of the subsystems can designate a selection technique to use and send to the other subsystem an indication of the chosen selection technique. One skilled in the art will appreciate that other negotiation techniques may be used to ensure that both the client subsystem and server subsystem apply the same selection technique.

In block 1002, both subsystems each collect information regarding the DOs—i.e., interfaces—and the versions for the DOs that it implements and builds its own protocol superset. In block 1004, each subsystem sends its protocol superset to the other subsystem. For example, the client subsystem sends its protocol superset to the server subsystem, and the server subsystem sends its protocol superset to the client subsystem. In one embodiment, each subsystem sends its protocol superset to the other subsystem during the base channel establishment between the subsystems. In block 1006, each subsystem receives the protocol superset from the other subsystem. In blocks 1008 and 1010, each subsystem performs version negotiation by iterating and finding a common version for each DO contained in the protocol superset. For example, each subsystem may iterate through the DOs and versions contained in its protocol superset and determine whether a matching DO and version can be found in the protocol superset received from the other subsystem. If a multiple number of versions for a DO are found in both protocol supersets, each subsystem applies a selection technique to select a single version of the DO. For example, a suitable selection technique may be to select the latest version. In block 1012, each subsystem creates a negotiated DO table which contains the negotiated DOs and their respective versions. The negotiated DO table contains the DOs and their respective versions that are supported by both subsystems, and the subsystems may communicate with each other using the negotiated versions of the interfaces—i.e., DOs—contained in the negotiated DO table.

Figure 11:
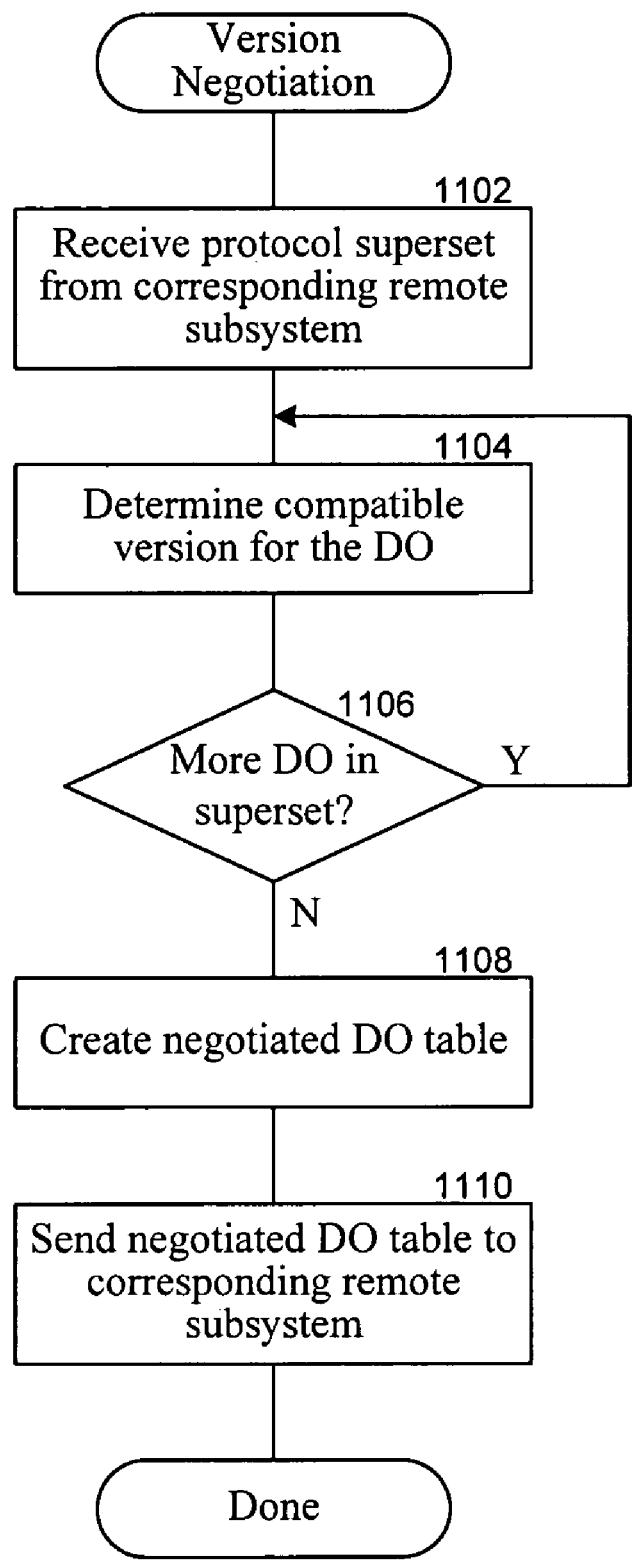
FIG. 11 is a flow diagram illustrating an example process by which a subsystem performs version negotiation, according to one embodiment.

FIG. 11 is a flow diagram illustrating an example process by which a subsystem performs version negotiation, according to one embodiment. In this embodiment, a server subsystem performs the version negotiation and sends the results of the version negotiation to the client subsystem. Thus, the negotiation of the version used for each DO—i.e., interface—is accomplished through an additional round trip message transmission from the client subsystem to the server subsystem. In block 1102, the server subsystem receives a protocol superset from a remote client subsystem. The received protocol superset specifies the DOs and their respective versions that are supported by the client subsystem. In blocks 1104 and 1106, the server subsystem performs version negotiation by iterating through the DOs and versions contained in the client subsystem's protocol superset and determining whether a matching DO and version can be found in its protocol superset. If a multiple number of versions for a DO are found in both protocol supersets, the server subsystem applies a selection technique to select a single version of the DO. For example, the server subsystem may select the latest version. In block 1108, the server subsystem creates a negotiated DO table which contains the negotiated DOs and their respective versions. In block 1110, the server subsystem sends the negotiated DO table to the client subsystem.

In another embodiment, the client subsystem may specify the selection technique to apply in cases where a multiple number of versions exist for a DO. For example, the client subsystem can send the selection technique, or an indication of the selection technique, to apply when the client subsystem sends its protocol superset to the server subsystem.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-implemented method in a first subsystem for availability checking on distributed objects, the method comprising:

establishing a connection between the first subsystem and a second subsystem;

providing at the first subsystem relationships for objects supported by the first subsystem, wherein a relationship for an object specifies the list of objects that are related to the object in that a related object needs to be created at the first subsystem whenever that object is created at the first subsystem;

receiving from a second subsystem via the established connection an identifier of a first object to create in the first subsystem, the first object having a plurality of related objects;

prior to creating an instance of the first object in the first subsystem, determining at the first subsystem whether the first object and each of the plurality of its related objects as specified by the relationship for the first object are supported by both the first subsystem and the second subsystem;

when it is determined that the first object and its related objects are not supported by both the first subsystem and the second subsystem, terminating the established connection between the first subsystem and the second subsystem; and when it is determined that the first object and its related objects are supported by both the first subsystem and the second subsystem, creating an instance of the first object if not already created and creating instances of any related objects if not already created wherein the instance of the first object in the first subsystem communicates with a corresponding instance of the first object in the second subsystem via the established connection.

2. The method of claim 1, wherein the list of objects indicates a sequence in which the objects in the list of objects are to be created.

3. The method of claim 1, wherein the relationship for an object specifies the list of objects that are related to a version range of the object.

4. The method of claim 1 further comprising, determining at the first subsystem whether a version of the first object and respective versions of its related objects are supported by both the first subsystem and the second subsystem.

5. The method of claim 1, wherein the relationships for objects supported by the first subsystem are provided by an application programmer.

6. The method of claim 1 further comprising identifying at the first subsystem a list of objects that are supported by both the first subsystem and the second subsystem.

7. The method of claim 1 further comprising identifying at the first subsystem a list of objects and a version for each object that are supported by both the first subsystem and the second subsystem.

8. The method of claim 1, wherein the relationship for the objects supported by the first subsystem are specified via declarative links in interface definitions that define the objects.

9. A computer-readable storage medium whose contents cause a distributed subsystem executing on a computer to:

determine relationships for objects supported by the subsystem, wherein a relationship for an object specifies the list of objects that are related to the object in that a related object needs to be created at the subsystem whenever that object is created at the subsystem;

receive from a remote subsystem via an established connection between the subsystem and the remote subsystem an identifier of a first object to create in the subsystem, the first object having a plurality of related objects; and prior to creating an instance of the first object in the subsystem, determine whether the first object and each of the plurality of its related objects in accordance with the relationship for the first object are supported by both the subsystem and the remote subsystem;

when it is determined that the first object and its related objects are not supported by both the subsystem and the remote subsystem, terminating the established connection between the subsystem and the remote subsystem; and when it is determined that the first object and its related objects are supported by both the subsystem and the remote subsystem, creating an instance of the first object if not already created and creating instances of any related objects if not already created, wherein the first object of the subsystem communicates with a corresponding first object in the remote subsystem via the established connection.

10. The computer-readable storage medium of claim 9, wherein the instance of each of the related objects are created in sequence in accordance with the list of objects.

11. The computer-readable storage medium of claim 9 further comprising content that cause the distributed subsystem to, responsive to determining that any one of the first object or its related objects in accordance with the relationship for the first object are not supported by both the subsystem and the remote subsystem, sending the remote subsystem an error condition.

12. The computer-readable storage medium of claim 9 wherein the relationship for an object specifies the list of objects that are related to a version range of the object, and further comprising content that cause the distributed subsystem to determine whether a version of the first object and respective versions of its related objects are supported by both the subsystem and the remote subsystem.

13. The computer-readable storage medium of claim 9 further comprising content that cause the distributed subsystem to determine a list of objects supported by both the subsystem and the remote subsystem.

14. The computer-readable storage medium of claim 9, wherein the subsystem is a client subsystem.

15. The computer-readable storage medium of claim 9, wherein the subsystem is a server subsystem.

16. A distributed subsystem of computer system having a processor and memory that performs the function of determining the availability of distributed objects before creating an instance of an object, the subsystem comprising:

the memory storing:
  a protocol superset being operable to identify objects supported by the subsystem;
  a relationship table being operable to specify relationships between objects supported by the subsystem and their respective list of related objects in that a related object of an object needs to be created at the subsystem whenever that object is created at the subsystem; and
  a negotiated table being operable to specify objects that are supported by the subsystem and a remote subsystem, such that the subsystem establishes a connection between the subsystem and the remote subsystem;

receives from the remote subsystem via the established connection an identifier an object to be created at the subsystem
  determines from information in the protocol superset, the relationship table, and the negotiated table whether the identified object and all its related objects are supported by both the subsystem and the remote subsystem prior to creating an instance of the identified object;
  when it is determined that the identified object and its related objects are not supported by both the subsystem and the remote subsystem, terminates the established connection between the subsystem and the remote subsystem; and when it is determined the identified object and its related objects are supported by both the subsystem and the remote subsystem, creates an instance of the identified object if not already created and creates instances of any related object if not already created wherein the instance of the identified object in the subsystem communicates with a corresponding instance of the identified object in the remote subsystem via the established connection.

* * * * *